United States Patent Office 3,109,254
Patented Nov. 5, 1963

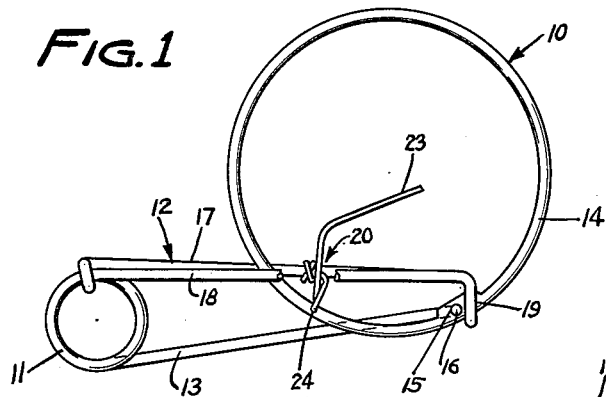
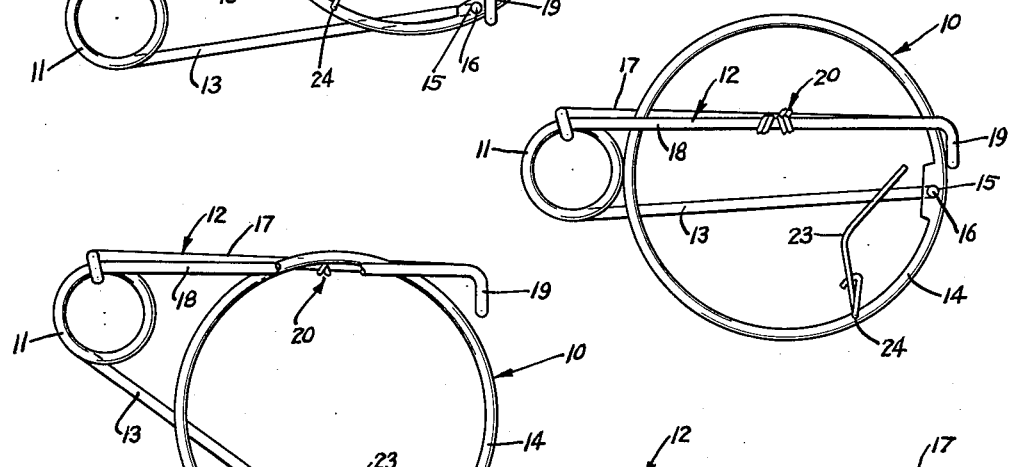
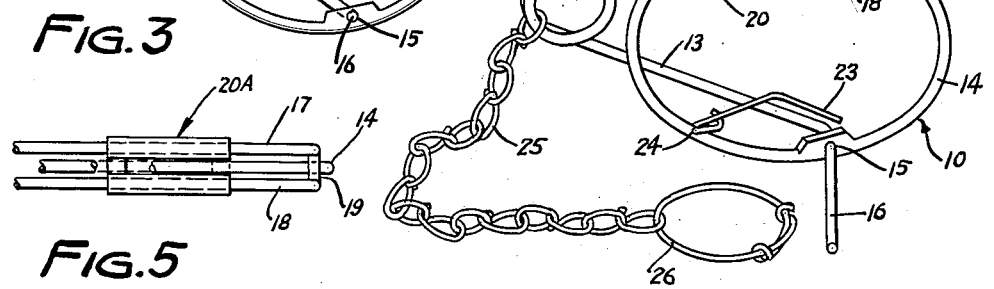
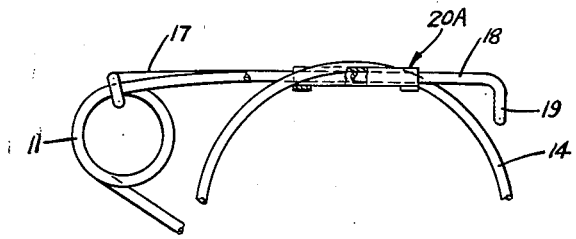

3,109,254
SNARE TRAP
William L. Woodward, R.R. 1, Houghton, S. Dak.
Filed Nov. 7, 1962, Ser. No. 235,989
4 Claims. (Cl. 43—85)

This invention relates to a trapping apparatus and more particularly to a snare trapping accessory for the purpose of catching small animals.

This application is a continuation-in-part of my earlier application Ser. No. 105,608, filed April 26, 1961, now abandoned.

It is an object of the present invention to provide a device for catching small animals in a simple manner, which device can be usually set in animal trails, dens, hollow logs, underwater runways, or the like, and will easily catch and hold all animals without producing damage to the hide or fur of the animal caught.

Another object of the present invention is to provide a trap which can be used for the purpose of trapping fur bearing animals, for catching pests and rodents around the home and all farm buildings, and also for catching snakes.

Still another object of the present invention is to provide a trap that can be produced, packaged, and sold in large quantities at a comparatively low cost, and which can be used any place under any weather conditions.

Further objects of this invention will be evident from a study of the following detailed description taken in conjunction with the accompanying drawing in which:

FIGURE 1 is a plan view of a snare trap made in accordance with the present invention and shown set and ready for use;

FIGURE 2 is a similar view of the snare trap shown with the trap in action just after being tripped;

FIGURE 3 is a similar view of the snare trap shown after full action, but without anything caught therein;

FIGURE 4 is a perspective view of a snare trap made in accordance with the present invention and shown unset;

FIGURE 5 is a fragmentary elevation showing a modified form of latching means; and FIGURE 6 is a fragmentary plan view of the modified latch.

Referring now to the drawing, a snare trap, indicated generally at 10, made in accordance with the present invention is shown to include a coil spring 11. The spring 11 is a spiral wire torsion spring having a pair of elongated extending arms 12 and 13. Spring arm 13 is composed of a single strand of heavy wire. It extends along one face of a flat wire ring 14 which lies generally in the plane defined by the spring arms. The free end of spring arm 13 is bent perpendicular to the plane defined generally by the pair of spring arms and is inserted through a hole 15 in ring 14 to form a pivotal attachment between the ring 14 and spring. The bent free end 16 of single spring arm 13 projects upwardly from the plane of the ring and spring arms.

Spring arm 12 is double being composed of a pair of spaced apart heavy wire strands 17 and 18 lying on opposite faces of said ring. The strand 17 extends below ring 14 as illustrated and strand 18 extends above ring 14. The free end of spring arm 12 is closed in a loop 19 lying outside of the periphery of ring 14 and being formed as an extension of strands 17 and 18. Loop 19 extends generally perpendicular to strands 17 and 18 of spring arm 12 in the direction of the other spring arm.

Relative movement of ring 14 between the strands 17 and 18 of the double spring arm 12 is permitted when the ring rotates on its pivotal connection with the single spring arm 13. This relative rotational movement occurs when the trap is set by squeezing the spring arms 12 and 13 together and when the trap is tripped to cause separation of the spring arms.

Latching means to hold the snare trap in set position is provided to the double spring arm 12 intermediate of its ends. In the form illustrated in FIGURES 1 to 4, the latching means 20 comprises a restricted aperture between the strands 17 and 18 of double spring arm 12 which is formed by a wire member extending from strand 18 to and around strand 17 and back to strand 18. Alternatively, as shown in FIGURES 5 and 6 the latch may be formed from an apertured piece of sheet metal 20A clamped to the strands 17 and 18 of spring arm 12 intermediate of its ends. The latch 20 lies on the spring arm 12 within the periphery of ring 14 so as to limit relative movement of the spring arms.

An elongated trigger means 23 is pivotally attached at 24 to ring 14 between the point of attachment of spring arm 13 and the spiral of the torsion spring 11. The trigger means is in the form of a stiff, but bendable, wire. It extends inwardly from the periphery of the ring 14 generally in the plane of the ring and is adapted to extend through the aperture of the latching means 20 to frictionally engage the same to hold the spring arms together against the tension of the spring to hold the trap in set position.

The trigger can be manipulated or bent so as to frictionally engage the latching means with whatever force is desired. This may be very light where very small animals are being trapped or may be heavier where larger animals are being trapped. When the trigger is disturbed by application of force sufficient to overcome the frictional engagement, the spring arms separate under tension of the spiral spring member and the ring 14 is pivoted to trap the animal between the double spring arm 12 and the inner periphery of the ring. The trigger is released when it is disturbed by virtue of an animal stepping on it or brushing against it. The action is virtually instantaneous.

The upper strand 18 of double arm 12 is shown broken away in FIGURE 1 to show the trigger extending between the spaced apart elements of the latching means defining the latching aperture. The same strand is shown broken away in FIGURE 3 to show how the latching means functions as a stop to limit the separation of the spring arms. Sensitivity of the latching and trigger means may be adjusted by sliding the latching means longitudinally along the strands 17 and 18 of the double spring arm. A chain 25, provided with a loop 26 at one end, is desirably attached to the snare trap 10 to the coil spring as shown in FIGURE 4 to provide means for securing the trap when set.

The snare trap according to the present invention is especially adapted to being placed over the entrance to a small animal hole or run where the trigger will be in the path of the animal. Its use, however, is not so limited.

It is apparent that many modifications and variations of this invention as hereinbefore set forth may be made without departing from the spirit and scope thereof. The specific embodiments described are given by way of example only and the invention is limited only by the terms of the appended claims.

I claim:

1. A snare trap comprising a spiral wire torsion spring having a pair of elongated extending arms; a flat wire ring lying generally in the plane defined by said spring arms; the first of said spring arms being composed of a single strand of wire extending along one face of said ring and being pivotally attached to said ring; the second of said spring arms being double, being composed of spaced apart wire strands lying on opposite faces of said ring, to permit relative movement of said ring between the strands of said double arm; the free end of said second spring arm being closed in a loop lying outside the periphery of said ring; latching means on said second arm intermediate of its ends extending between the strands of said double arm and lying within the periphery of said ring so as to limit relative movement of said first and second spring arms, said latching means including a pair of elements spaced apart along the length of the double arm and each extending between the strands of said double arm to define an aperture therebetween; an elongated trigger means pivotally attached to said ring between the point of attachment of said first spring arm and the spiral of said torsion spring, said trigger means extending inwardly from the periphery of said ring generally in the plane of the ring and adapted to extend through the aperture of said latching means to frictionally engage the same to hold said spring arms together against the tension of the spring to hold said trap in set position and to release said arms when disturbed by an animal.

2. A snare trap according to claim 1 further characterized in that the free end of said second spring arm including said closed loop is turned inwardly at its tip toward said first spring arm.

3. A snare trap according to claim 1 further characterized in that the free end of said first spring arm is turned at a right angle to extend generally perpendicular to the plane of said ring and said pivotal attachment is by virtue of said free end extending through a hole in said ring.

4. A snare trap comprising a spiral wire torsion spring having a pair of elongated extending arms; a flat ring lying generally in the plane defined by said spring arms; the first of said spring arms extending along one face of said ring and being pivotally attached to said ring, the second of said spring arms extending along the opposite face of said ring, said ring being free for relative movement therebetween; a loop at the free end of said second spring arm, said loop lying outside the periphery of said ring; latching means on said second spring arm intermediate of its ends, extending through the plane of said ring and lying within the periphery of said ring so as to limit relative movement of said first and second spring arms, said latching means including a pair of elements spaced apart along the length of said second arm and extending through the plane of said ring so as to define a trigger receiving area therebetween; and elongated trigger means pivotally attached to said ring between the point of attachment of said first spring arm and the spiral of said torsion spring, said trigger means extending inwardly from the periphery of said ring generally in the plane of the ring and adapted, in association with said latching means, to hold said spring arms together against the tension of the spring and to release said arms.

References Cited in the file of this patent
UNITED STATES PATENTS

| | | |
|---|---|---|
| 218,532 | Hooker | Aug. 12, 1879 |
| 1,064,647 | Hoffman | June 10, 1913 |
| 2,723,486 | Bouma | Nov. 15, 1955 |